United States Patent
Dayka et al.

(10) Patent No.: US 9,268,974 B2
(45) Date of Patent: Feb. 23, 2016

(54) HIGH-FREQUENCY ENTROPY EXTRACTION FROM TIMING JITTER

(71) Applicant: International Business Machines Corporation, Armonk, NY (US)

(72) Inventors: John C. Dayka, New Paltz, NY (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/690,925

(22) Filed: Nov. 30, 2012

(65) Prior Publication Data

US 2013/0090903 A1    Apr. 11, 2013

Related U.S. Application Data

(63) Continuation of application No. 12/635,830, filed on Dec. 11, 2009.

(51) Int. Cl.
 *G06F 1/02* (2006.01)
 *G06G 7/12* (2006.01)
 *G06F 7/58* (2006.01)

(52) U.S. Cl.
 CPC . *G06G 7/12* (2013.01); *G06F 7/588* (2013.01)

(58) Field of Classification Search
 None
 See application file for complete search history.

(56) References Cited

U.S. PATENT DOCUMENTS

| | | | |
|---|---|---|---|
| 6,076,097 A | 6/2000 | London et al. | |
| 6,628,999 B1 * | 9/2003 | Klaas et al. | 700/94 |
| 6,639,939 B1 * | 10/2003 | Naden et al. | 375/140 |
| 6,862,605 B2 | 3/2005 | Wilber | |
| 7,293,054 B2 * | 11/2007 | Clements et al. | 708/252 |
| 2003/0037079 A1 | 2/2003 | Wilber | |
| 2003/0081667 A1 * | 5/2003 | Camnitz et al. | 375/226 |
| 2003/0143951 A1 * | 7/2003 | Challa et al. | 455/20 |
| 2004/0240478 A1 * | 12/2004 | Goren et al. | 370/503 |
| 2005/0194134 A1 * | 9/2005 | McGregor et al. | 166/264 |
| 2005/0203979 A1 * | 9/2005 | Clements et al. | 708/251 |
| 2005/0244068 A1 | 11/2005 | Nakachi et al. | |

(Continued)

FOREIGN PATENT DOCUMENTS

| | | |
|---|---|---|
| EP | 1840731 A2 | 10/2007 |
| JP | 4077798 | 3/1992 |

(Continued)

OTHER PUBLICATIONS

WayBackMachine, [online]; [retrieved on Jan. 31, 2011]; retrieved from the Internet http://replay.waybackmachine.org/20090530174205/http://www.citadelsoftware.ca/fortuna/Fortuna_Entropy.htm Anonymous, "Entropy Sources," 2006.

(Continued)

*Primary Examiner* — Henry Tsai
*Assistant Examiner* — Aurangzeb Hassan
(74) *Attorney, Agent, or Firm* — Cantor Colburn LLP; William A. Kinnaman, Jr.

(57) ABSTRACT

A method for creating entropy in a virtualized computing environment includes waking one or more samplers, each sampler having a sampling frequency; sampling a sample source with each of the one or more samplers; placing each of the samplers in an inactive state when not sampling; determining a difference between an expected value and a sampled value at each sampler; and providing a function of the difference from each of the one or more samplers to an aggregator.

7 Claims, 3 Drawing Sheets

(56) References Cited

U.S. PATENT DOCUMENTS

| | | | |
|---|---|---|---|
| 2010/0106757 A1* | 4/2010 | Matthews et al. | 708/251 |
| 2010/0331019 A1* | 12/2010 | Bhattacharjee et al. | 455/458 |
| 2010/0333071 A1* | 12/2010 | Kuiper et al. | 717/128 |
| 2011/0026643 A1* | 2/2011 | Ruelke et al. | 375/319 |
| 2011/0102451 A1* | 5/2011 | Broga et al. | 345/589 |

FOREIGN PATENT DOCUMENTS

| | | | |
|---|---|---|---|
| JP | 2000134459 A | 5/2000 |
| JP | 2006304329 A | 11/2006 |
| JP | 2007079948 A | 3/2007 |
| JP | 2007171724 A | 7/2007 |

OTHER PUBLICATIONS

International Search Report; International Application No. PCT/EP2010/069138; International Filing Date: Dec. 8, 2010; Date Mailed: Feb. 9, 2011.

International Search Report—Written Opinion; International Application No. PCT/EP2010/069138; International Filing Date: Dec. 8, 2010; Date Mailed: Feb. 9, 2011.

WayBackMachine, [online]; [retrieved on Jan. 31, 2011]; retrieved from the Internet http://replay.waybackmachine.org/20060324101731/http://www.citadelsoftware.ca/hptimer/hptimer.htm Anonymous, "Randomness From the High Performance Frequency Counter?," 2006.

\* cited by examiner

HIGH-FREQUENCY ENTROPY EXTRACTION FROM TIMING JITTER

CROSS-REFERENCE TO RELATED APPLICATIONS AND PRIORITY CLAIM

This application is a continuation of U.S. Non-Provisional application Ser. No. 12/635,830, entitled "HIGH-FREQUENCY ENTROPY EXTRACTION FROM TIMING JITTER", filed Dec. 11, 2009, which is incorporated herein by reference in its entirety.

BACKGROUND

The present invention relates to random number generators, and more specifically, to utilizing timing jitter in generation of random generator numbers.

Random-number generation generally consists of two stages, short, unpredictable true random numbers (seeds) feeding fast, deterministic random number generators (also called pseudo-random number generators). The deterministic generators contribute no true randomness, but may improve statistical properties of the data stream. All non-predictability is derived from the initial seed. Therefore, the quality and throughput of entropy derived from a particular seed is critical.

A deterministic generator (often simply called an "extractor") is a function which, when applied to a seed (such as radioactive decay, or thermal noise), generates a random output that may be shorter, yet uniformly distributed. In other words, outputting a completely random sample from a semi-random input. The goal of this process is to generate a truly random output stream, which could then be considered as being a true random number generator (TRNG).

In certain popular entropy extractors, raw information content ("entropy") is extracted from measured timing differences. Measured timing differences shall be referred to generally a "jitter" or "clock jitter." Thus, jitter is one seed from which random numbers may be generated.

Jitter is derived from frequent, periodic sampling of an unpredictable event source, typically a clock-derived source. Jitter sampling is usually done at the highest feasible frequency, because the sampling frequency limits the entropy extraction rate.

Jitter-based entropy extraction (i.e., using jitter as a seed) becomes inefficient as the variation in latency decreases because measurements of periodic events, being entirely predictable, contribute no entropy. Indeed, the amount of entropy extractable from a data stream is inversely related to its compressibility, and information related to periodic events may be compressed very efficiently.

In virtualized, timesliced environments, short-term variation of clock (or timer) jitter is generally negligible. Thus, extractable entropy bandwidth is severely limited. Each timesliced process owns its time intervals (timeslices) exclusively, without interference from other active processes. Within an exclusively owned timeslice, the process perceives an environment dedicated to its execution, and periodic sampling results in negligible variation due to the lack of interference. Indeed, in a typical timesliced environment, minimizing cross-process interference is an explicit design goal, which reduces a significant contribution to latency variance as a side effect.

In addition to the lack of inter-process interference, virtualization, especially clock virtualization, may further limit clock jitter. Virtualization separates observable events from their original sources, possibly reducing the entropy during translation. As an example, timer (or clock) virtualization transforms time snapshots of a real time source, remapping into a different time domain. If the virtualized timer is also quantized, which is typical, less entropy remains extractable than in the original source (as described above, quantization reduces entropy because it improves periodicity, therefore compressibility).

The only reliable, periodic interruption in such systems is related to timeslice-switching. Timeslice-switching occurs as a result of administrative operations during timeslicing and are not predictable to arbitrary precision. Essentially, timeslice switches are unpredictable events.

Unfortunately, timeslice switches, also referred to as "context switches" in this context," are relatively infrequent. Indeed, a range of milliseconds is typical, containing tens of millions of (or considerably more) clock cycles within a timeslice. For this reason, it is impractical to use traditional, single-process entropy extractors in such an environment.

SUMMARY

According to one embodiment of the present invention, a method for creating entropy in a virtualized computing environment is disclosed. The method of this embodiment includes: waking one or more samplers, each sampler having a sampling frequency; sampling a sample source with each of the one or more samplers; placing each of the samplers in an inactive state when not sampling; determining a difference between an expected value and a sampled value at each sampler; and providing a function of the difference from each of the one or more samplers to an aggregator.

Another embodiment of the present invention is directed to a system for providing an entropy seed. The system of this embodiment includes a sample source that provides a value, two or more samplers coupled to the sample source that sample the value at different times and an aggregator that causes the samplers to go into a sleep mode when not sampling and that receives a difference between the value sampled by each sampler and an expected value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

One embodiment of the present invention may be directed to a system that utilized separate entropy measurements by multiple, parallel, entropy extractors (samplers) coupled to a shared aggregator. In one embodiment, the extraction time of each sampler is scheduled such that successive samples may typically be taken from different time slices. When not sampling, the samplers idle/wait so that they do not utilized an appreciable amount of computing power. In one embodiment, a number of samplers sufficient to produce a reasonable sample within each timeslice are used. The parallel samples are aggregated to provide a steady stream of entropy samples, much more frequent than timeslice switches. In this manner, the aggregator may provide a single, steady entropy stream as an output.

Figure 1:
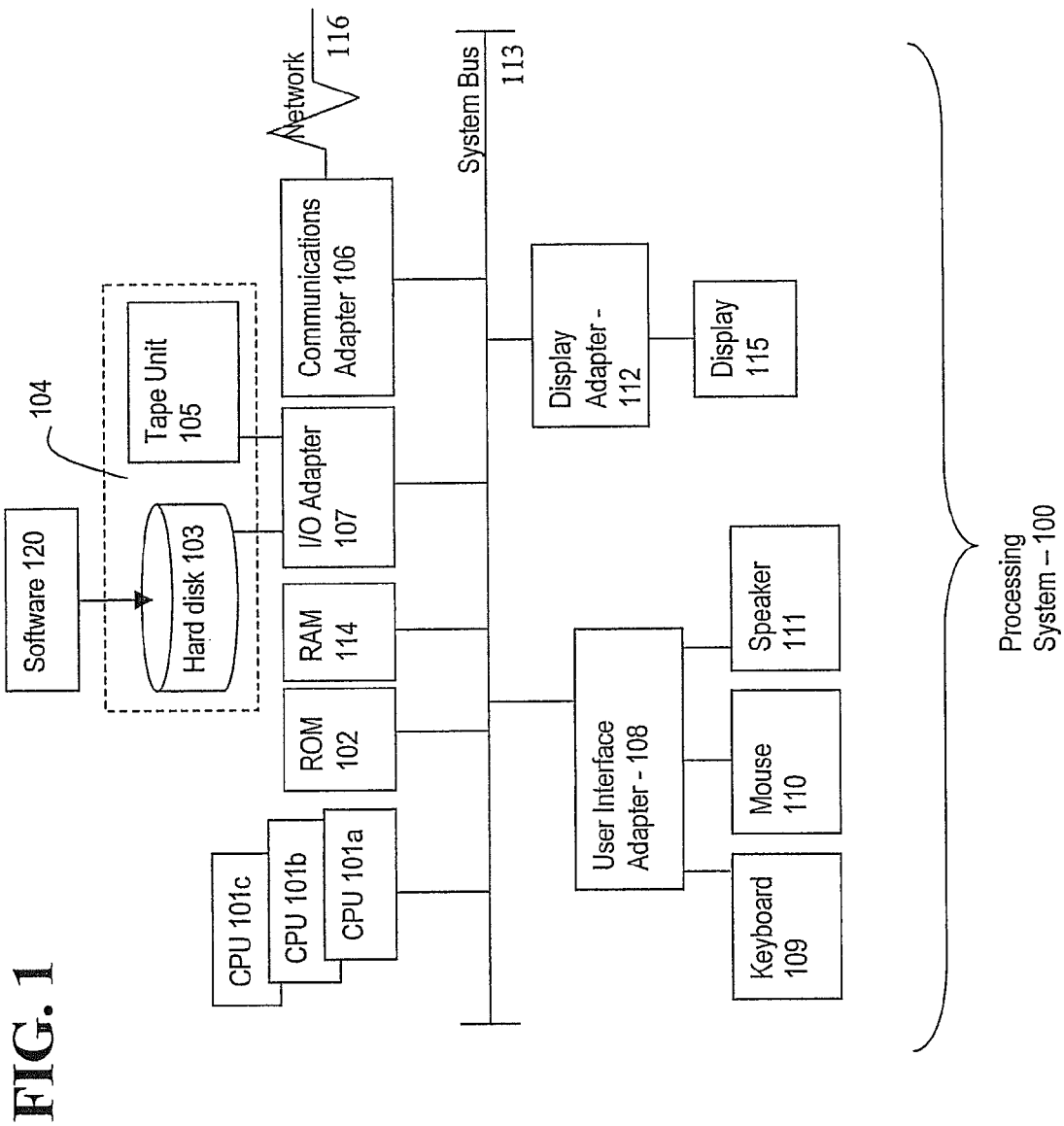
FIG. 1 shows an example of a computing system on which embodiments of the present invention may be implemented.

FIG. 1 shows an example of a computing system on which embodiments of the present invention may be implemented. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a Small Computer System Interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device. It shall be understood that the system 100 may include multiple computing devices linked together by a communication network. For example, there may exist a client-server relationship between two systems and processing may be split between the two.

Examples of operating systems that may be supported by the system 100 include Windows 95, Windows 98, Windows NT 4.0, Windows XP, Windows 2000, Windows CE, Windows Vista, Windows 7, Mac OS, MVS, AIX, Linux, and UNIX, or any other suitable operating system. The system 100 also includes a network interface 106 for communicating over a network 116. The network 116 can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine-readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

Figure 2:
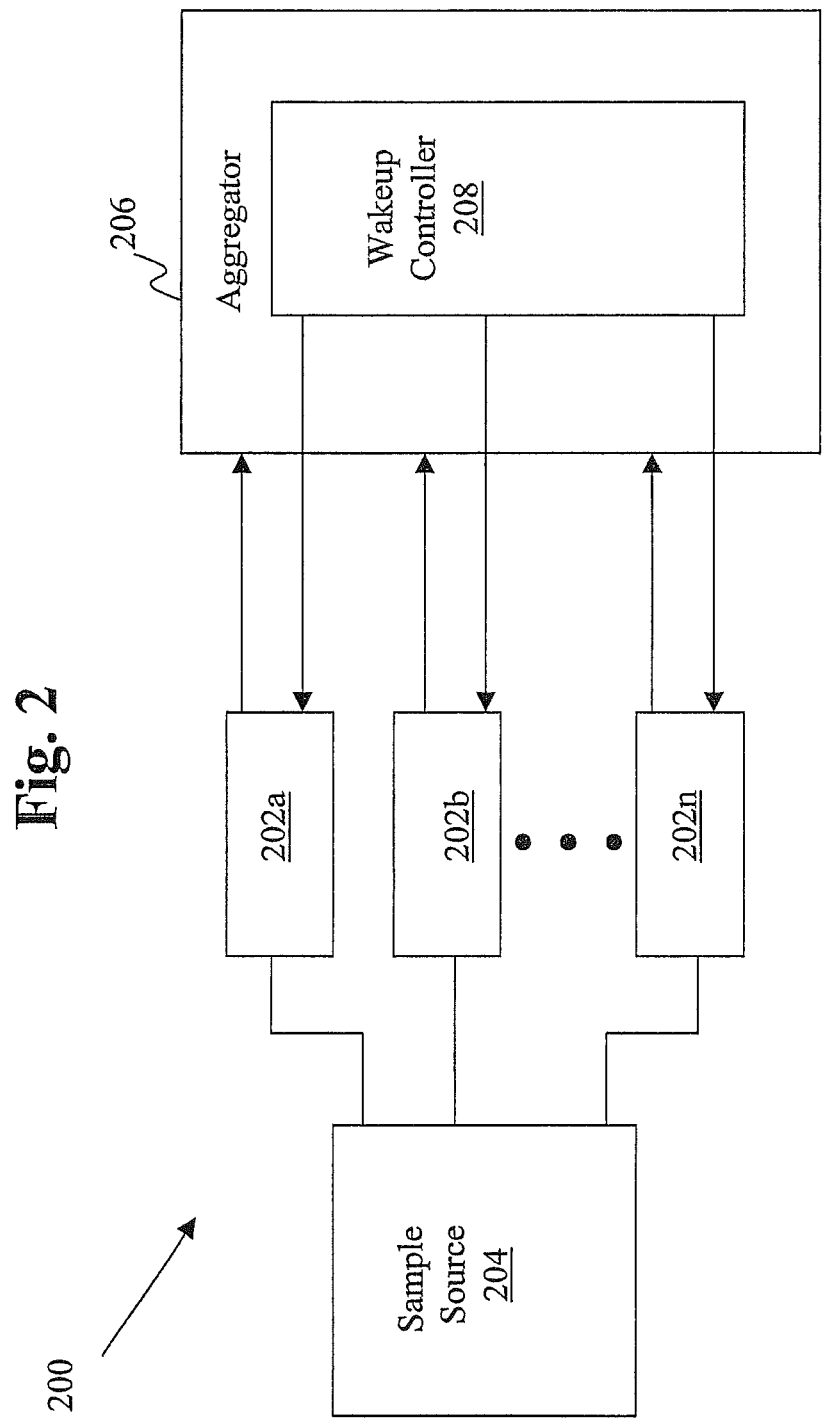
FIG. 2 shows a system diagram of an entropy extraction system according to one embodiment of the present invention.

FIG. 2 shows a more detailed depiction of a system 200 according to one embodiment of the present invention. The system 200 shown in FIG. 2 may be implemented in the computing system shown in FIG. 1. The system shown in FIG. 2 may be referred to herein as an entropy generation system.

In general, the system 200 receives various inputs and generates an entropy stream as an output. In more detail, the system 200 may, in one embodiment, utilize parallel, low-frequency sampler processes to generate a single, steady stream of time samples at higher frequencies than a single entropy extractor can maintain.

The system 200 may include one or more jitter samplers 202a-202n. Each jitter sampler 202 may measure jitter of over large enough periods to frequently (or always) sample in different timeslices. In one embodiment, each jitter sampler 202 samples a sample source 204 based on signals received from a sample controller 206.

In one embodiment, the sample source 204 is a single source. In other embodiments, one or more of the samplers 202 may be coupled to different sample sources. Regardless, in one embodiment, the sample source 204 operates outside of the "timesliced" environment. That is, the sample source 204 may continually run. The sample source 204 may be, for example, a timer or accumulator or other periodically varying source that may be present in a computing system. The remainder of the description will assume that the sample source 204 is an accumulator that is continually accumulating based on some periodic input. Of course, the invention not limited to utilizing such a sample source.

Each of the samplers 202 may be coupled to an aggregator 206. The aggregator 206 controls operation of the samplers 202 in one embodiment. To that end, the aggregator 206 may include a wakeup controller 208 that causes the samplers 202 to sample the sample source 204 at certain time.

In operation, the sample source 204 may continually run and operate in a non-timeslice environment. The aggregator 206, the wakeup controller 208, and the samplers 202 may all operate in a timeslice environment. It shall be understood that the system of FIG. 2 includes periodic wakeup events and does not rely on busy-waiting. This is opposed to prior art jitter collectors that utilize tight loops to wait for short periods of time. In the present invention, the samplers 202 receive periodic wakeup events from the aggregator 206 and spend the rest of the time without consuming CPU cycles. This approach may be preferable in a timeslice environment because it minimizes the drain on system resources. Since samplers 202 of this embodiment consume almost no resources while waiting for a wakeup event, the system 200 may scale to a large number of samplers 202 without noticeably increasing system load. In one embodiment, sampler processes schedule themselves to sample time periodically, spending time inactive between measurements. Typically, a sampler would use a "sleep"-style system capability to get notified after a period asynchronously. (As discussed above, asynchronous notification uses no system resources during the inactive period.)

In operation, each sampler 202, when awakened by the aggregator 206 (in particular, by the wakeup controller 208), may calculate a local jitter reading. Jitter is typically defined as the difference between a reading of a high-resolution timer (e.g., the sample source 204) and an expected value. The expected value may be calculated, for example, when starting the "sleep" call. The difference (calculated jitter) is passed to the aggregator 206, allowing it to post-process the sample. The aggregator 206 may output freshly extracted entropy when any of the samplers is activated.

In one embodiment, the system 200 may not require coordination between sampler 202 processes. For example, each sampler 202 may interact only with the aggregator 296 through a single-directional channel. Indeed, unidirectional communication may be preferred but is not required. Since samplers are uncoordinated, and need only to send data to a single system-wide aggregator 206, parallelized sampling as disclosed herein may have almost limitless scalability.

Each sampler may schedule its own sampling times to accommodate timeslice switches. This may be done exploiting knowledge of the timeslice period time, or discovered by, for example, by a timeslice monitor. If subsequent readings are made in different timeslices, jitter variation may be increased due to time variation of timeslice switching, which can be much higher than variation between samples within the same timeslice.

Figure 3:
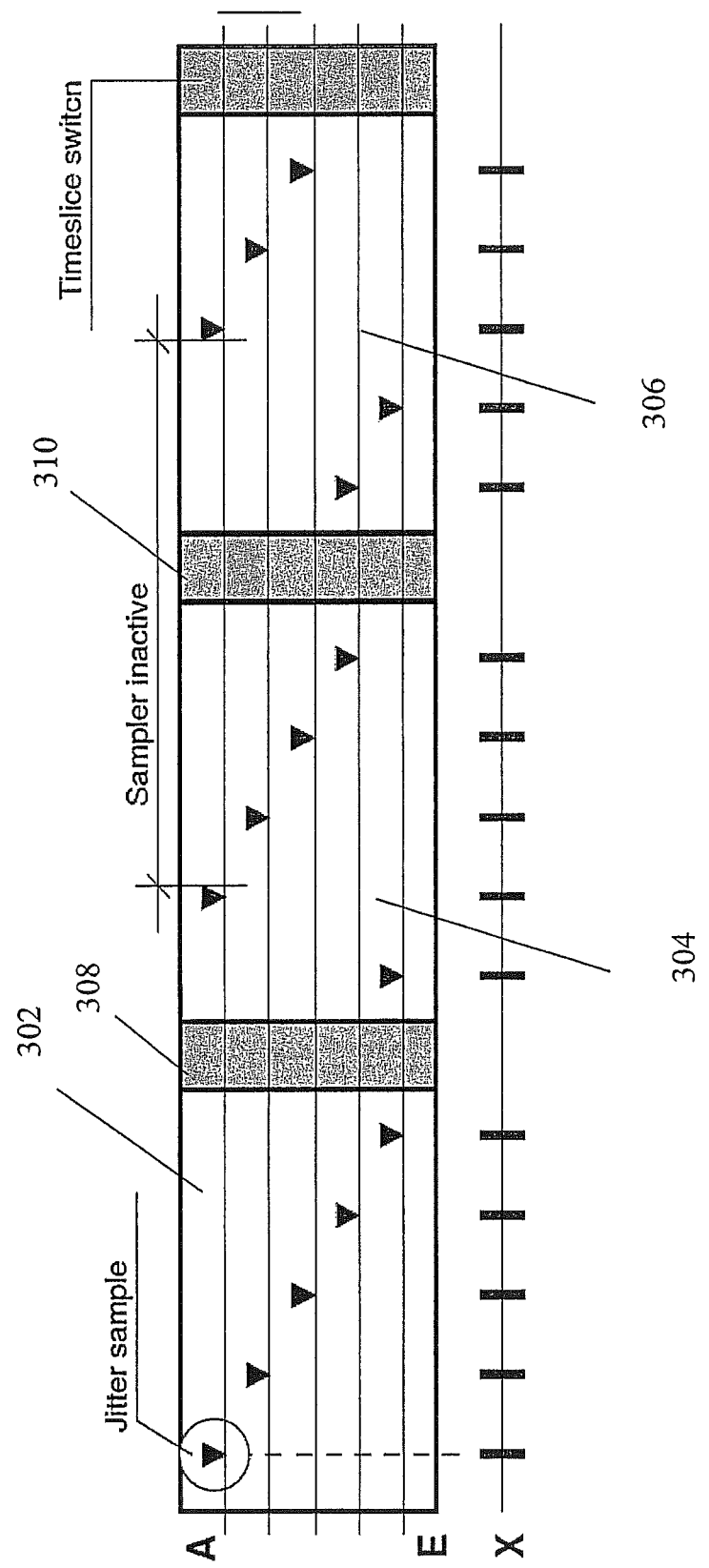
FIG. 3 shows a timing diagram of the operation of one embodiment of the present invention.

FIG. 3 shows a timing diagram detailing when certain samplers (A-E) sample values stored in a sample source. In one embodiment, samplers are launched synchronized, under control of an aggregate extractor. In the timing diagram, processes A to E sample clocks in timeslices 302, 304 and 306. The timeslices 302, 304 and 306 are separated by timeslice administration regions 308 and 310 (also referred to as a time slice switch). Triangles indicate where samplers schedule to take samples. As shown, each sampler schedules to be notified after the same amount of time, which is usually slightly over the timeslice-switch period. Startup delay (incidental or enforced) between the samplers results in some offset between samples. As each sample is separated from others of the sampling process by at least one timeslice switch, each sample has a chance to encounter switching-induced jitter. (Note that the illustrated setup is completely oblivious to short-term predictability, as samplers never take multiple measurements within a timeslice.)

The X aggregator process aggregates results from processes A to E, as indicated by dashes. Note that the relative size of timeslice switch is exaggerated; in a practical system, one would perceive X output at almost equidistant intervals (if sampler processes are properly synchronized).

The above described system may operated more efficiently in the event that each sample samples at a sufficient low frequency to capture administration time noise between subsequent samples. Advantageously, operating a system as described above may allow for multiple samples to be taken in each timeslice and combining these samples produces entropy updates at a much higher frequency than each individual extractor process. That is, increasing the number of extractors can increase the frequency of entropy updates without causing a major system tax. In addition, samplers do not need busy-waiting (tight loops), and consume essentially no system resources between taking samples. Since samplers rely on infrequent, externally induced wakeup events, the system may operate with low-priority samplers. This is in contrast to jitter measurements in tight loops typically performed within regular or high-priority processes.

In one embodiment, the samplers may schedule themselves independently, without requiring coordination from the aggregator. After the sampler processes have been launched, the system needs minimal communications: new entropy is periodically passed to the aggregator and published by the aggregator to the rest of the system. However, publishing is driven by the system, and does not interfere with sampling. In addition, combined with the independence of samplers, the lack of resource consumption between samples, and the lack of inter-sampler communication, the disclosed system scales to extremely large numbers of samplers, allowing entropy extraction from even infinitesimally small local jitter.

In one embodiment, due to the large period between each sample for a particular sampler, one may use complex algorithms to extract jitter from each measurement. Such algorithms could exploit complex post-processing (after taking the measurement), preprocessing (before entering sleep), or both. Particularly, efficient stateful compression is possible in the present system and compression is an effective way of entropy extraction. In addition, per-sampler jitter extraction may also exploit stateful algorithms, as it can keep local history. To maintain scalability, each sampler may depend only on its own history (aggregate state), but each sampler can record almost arbitrary amounts of history, at the cost of increased memory usage.

In addition, because jitter measurements are decoupled from providing entropy to callers (or system-wide entropy streams) time-critical sections may be decoupled form from compute-intensive tasks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for creating entropy in a virtualized computing environment, the method comprising: waking two samplers including a first sampler and a second sampler, the first sampler having a first sampling frequency and the second sampler having a second sampling frequency different than the first sampling frequency; performing a first sample of a sample source at a first time with the first sampler and performing a second sample of the sample source at a second time with the second sampler, the first time being different than the second time, and wherein the first and second samplers are woken at different times by different signals received from a timeslice aggregator; placing each of the samplers in an inactive state when not sampling; determining a difference between an expected value and a sampled value at each of the samplers; and providing a function of the difference from each of the samplers to the timeslice aggregator; wherein each sampler takes only a single sample per timeslice.

2. The method of claim 1, wherein the sample source is an accumulator.

3. The method of claim 2, wherein the sample source is a timer.

4. The method of claim 1, wherein each sampler is woken at a different interval.

5. The method of claim 1, further comprising:
   determining a timeslice length; and
   setting the sampling frequency of each sampler such that the sampler samples no more than once per timeslice.

6. The method of claim 1, further comprising: aggregating the differences in the timeslice aggregator; and providing an entropy output from the timeslice aggregator for post-processing.

7. The method of claim 1, wherein timeslices are separated by an administrative interval having a varying length.

* * * * *